United States Patent [19]

Hamblen

[11] Patent Number: 4,948,214

[45] Date of Patent: Aug. 14, 1990

[54] STEP-INDEX LIGHT GUIDE AND GRADIENT INDEX MICROLENS DEVICE FOR LED IMAGING

[75] Inventor: David P. Hamblen, Rochester, N.Y.

[73] Assignee: Eastman Kodak Company, Rochester, N.Y.

[21] Appl. No.: 377,641

[22] Filed: Jul. 10, 1989

[51] Int. Cl.⁵ ............................................. G02B 6/00
[52] U.S. Cl. .................................. 350/413; 350/96.31
[58] Field of Search ............................. 350/413, 96.31

[56] References Cited

U.S. PATENT DOCUMENTS 4,557,581  10/1985  Woolley et al. .................... 350/413

FOREIGN PATENT DOCUMENTS 58-198001  11/1983  Japan .
60-119501   6/1985  Japan .
61-241702  10/1986  Japan .
61-275710  12/1986  Japan .

OTHER PUBLICATIONS

NSG America Inc Selfoc Lens Array catalog (Nippon Sheet Glass Co., Ltd.).

Primary Examiner—Rodney B. Bovernick
Assistant Examiner—Rebecca D. Gass
Attorney, Agent, or Firm—John B. Turner

[57] ABSTRACT

Each individual light emitter of a LED linear array is imaged by a discrete step-index light guide and gradient index microlens device. The light guides consist of high refractive index cores, each surrounded by low refractive index matter. A multiplicity of light guides are deposited in channels formed in a host material, such as a silicon wafer. The host material between adjacent channels functions as an opaque separator to prevent cross-talk between adjacent light guides. Optically bonded to the LED array, the light guides conduct a large portion of the diffuse light emitted to a series of microlenses optically bonded to and in registration with the exit end of each light guide. The microlenses are constructed in a transparent substrate, with each microlens having a spherical or aspherical gradient index profile and short focal length.

9 Claims, 2 Drawing Sheets

STEP-INDEX LIGHT GUIDE AND GRADIENT INDEX MICROLENS DEVICE FOR LED IMAGING

DESCRIPTION OF THE PRIOR ART

In optical scanning devices such as copiers, facsimile machines and printers, lens arrays formed of gradient index cylindrical microlenses or rods, sometimes called GRIN (from GRadient INdex) rods, are used in place of conventional lens and mirror systems. Lens arrays, such as those sold by Nippon Sheet Glass Co,. Ltd. under the SELFOC trademark, are composed of one or two linear rows of cylindrical rods, each rod typically 1 mm in diameter. The rods are aligned in two staggered lines between two flame retardant fiberglass-reinforced plastic walls. The interstices between the rods are filled with black silicone rubber to position each individual rod. The manufacturer claims that this also prevents crosstalk between the adjacent rods. In the cylindrical lenses utilized in these arrays, the index of refraction varies in the direction perpendicular to the optical axis (long axis), particularly in a parabolic profile in which the refractive index is highest on the optical axis and decreases toward the periphery as the square of the radial distance from the optical axis.

Linear arrays of cylindrical lenses such as described above have a number of features. They provide optical systems for 1:1 imaging applications. They produce erect, real images. They are also small in size, light weight and significantly decrease the conjugate distance between object and image from 600–1,200 mm to between 20–70 mm.

In a linear array, such as described above, the light power distribution at the image plane, which is a combination of the power distribution of each individual cylindrical lens where the images overlap, is inherently uneven. For fiber optic coupler applications this poses no noticeable problem. However, for copier and facsimile applications where photographs or material having tonal gradients are to be reproduced, such linear arrays produce light and dark streaks. Since LEDs are Lambertion emitters (i.e. light is diffused in a number of directions over a hemispherical distribution angle) and since each cylindrical lens of the linear array is in registry with 11 or more LEDs (at least 300 LEDs per inch), there is considerable cross talk between adjacent LEDs. Multiplexing individual LEDs (i.e., off and on in relationship to adjacent light emitters) causes light to occupy space in the image plane intended for another LED. Also, when used in LED printers, the linear arrays typically transmit less than 10% of the light emitted by the LEDs from object to image plane. In order to insure that sufficient light is transmitted to the image plane, the light output of the LEDs must be increased, which, in turn, requires greater energy consumption and generates more heat. The greater the heat generated the greater the size of the heat sink necessary to dissipate the heat.

SUMMARY OF THE INVENTION

The present invention resides in a step-index light guide and gradient index microlens device, and method of manufacturing the same. The light guide-microlens device of the present invention is useful for imaging a large fraction of light from a diffuse source such as a light emitting diode. Each step index light guide includes an opaque host material, a core of high refractive index material and a layer of low refractive index material separating the core from the host material. A micro imaging gradient index lens is formed in a substrate which is bonded to the host material in optical registration with the optical axis of the core. The method includes providing a host material which is opaque to light, forming one or more channels in the host material, depositing a low refractive index light reflective film on the surface of the channels, filling the channels with a high refractive index material to form the light guides, forming one or more gradient index microlenses in a substrate and bonding the substrate to the host material with each microlens in optical alignment with a corresponding one of the light guides.

The foregoing structure and method has a number of advantages, as will be apparent to those skilled in the art, including those set forth below.

DRAWINGS

DESCRIPTION OF THE PREFERRED EMBODIMENT

Figure 1:
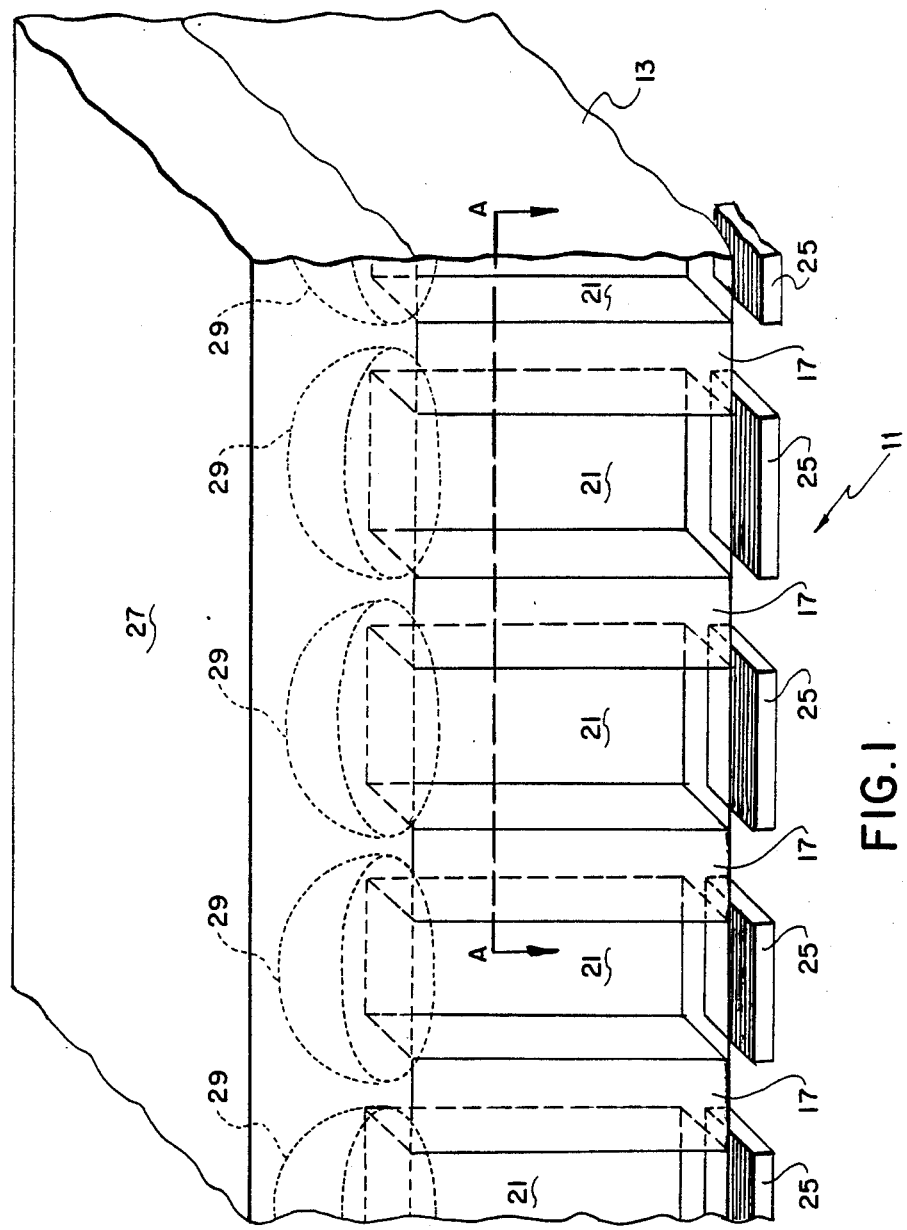
FIG. 1 is a schematic perspective view of the composite LED, light guide and microlens imaging device of the present invention.
Figure 2:
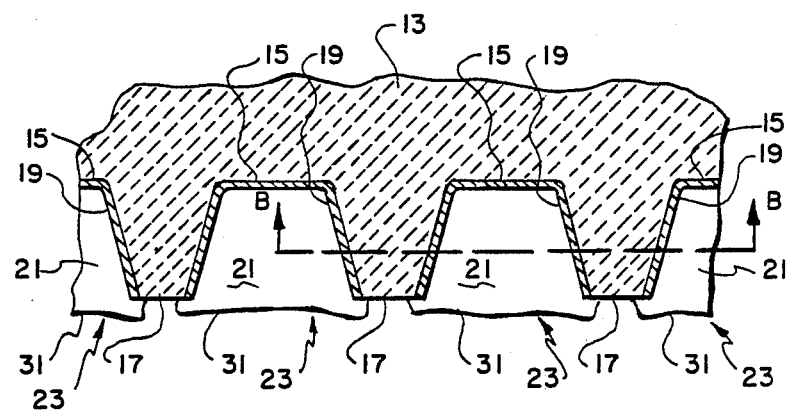
FIG. 2 is a cross-sectional view of the composite device of FIG. 1, taken along lines A—A.

With reference to the drawings, composite LED, light guide and microlens imaging device 11 (FIG. 1) includes an opaque host material 13, such as a silicon wafer or other etchable, opaque substrate, in which are provided a series of channels 15 (FIG. 2), spaced apart by opaque separators 17. The three sides of each channel 15 are coated with a low refractive index film 19, having an index of refraction preferably much lower than the index of core 21, and preferably in the range of n=1.42−1.46. After the films 19 are deposited, the channels 15 are filled with cores 21 of transparent high refractive index material. The resultant structure is a series of step-index light guides 23. The air, which contacts the cores 21 on their exposed side, constitutes low refractive index matter and performs the same function, namely to reflect light back into core 21, as its low refractive index matter in the form of the film 19 which contacts the core on its other sides, namely to reflect light back into core 21.

Figure 3:
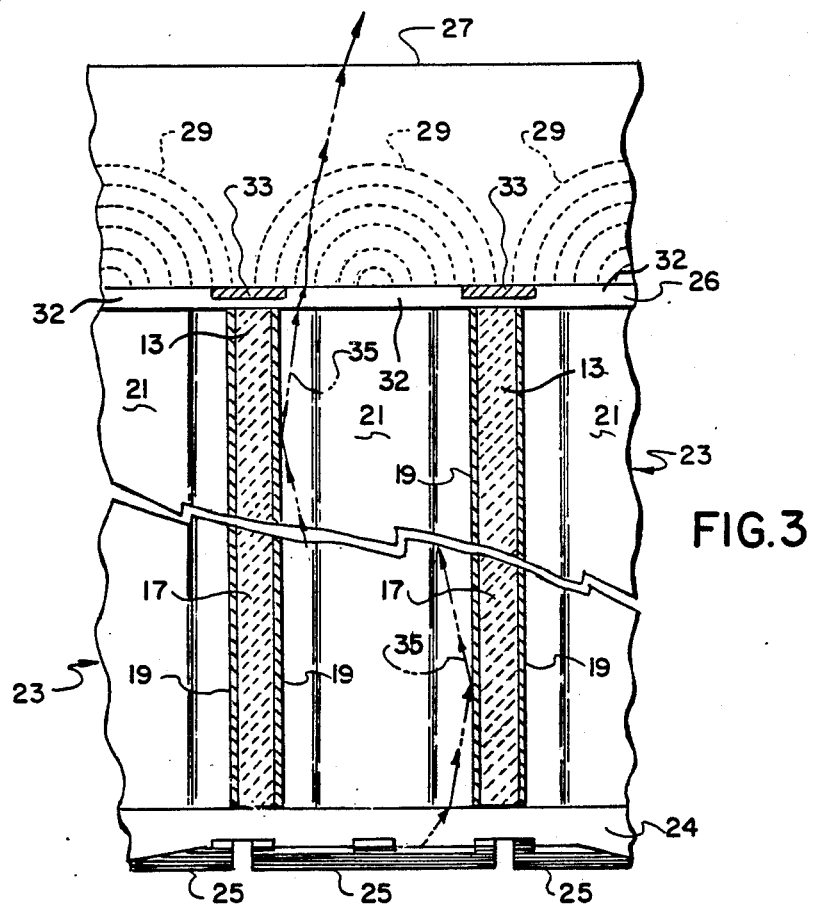
FIG. 3 is an partial cross-sectional view taken along lines B—B of FIG. 2.

As best illustrated in FIG. 3, bonded to one end of each step-index light guide 23, via optical cement 24, is a LED 25. Optically bonded, via optical cement 26, to the opposite, exit end of step-index light guides 23 is a substrate 27 in which are formed a plurality of micro imaging lenses 29, each in optical registration with a step-index light guide 23.

Using photolithographic techniques, channels 15 (FIG. 2) can be formed in host material 13 by projection masking, in conjunction with plasma-ion or wet etching techniques used in the microelectronics industry. In projection masking, photo resist is deposited on host material 13 and is exposed through a mask having the desired pattern. After ultraviolet exposure and development the unexposed resist is removed, leaving openings to permit the desired etching of the non-coated substrate. The width of these openings in the resist is approximately equal to one width of the LEDs 25. The depth of channels 15, which is controlled by the length of time the etching process is carried out, is typically less than the other width of the LEDs 25. As can be seen from FIG. 2, the process leaves channels which, in cross-section are somewhat trough shaped. After channels 15 are etched, a film of low refractive index material 19, such as silicone dioxide ($SiO_2$), n=1.459, or magnesium flouride ($MgF_2$), n=1.378, is deposited by chemical vapor deposition or spin-on glass techniques. Typically, high refractive index core 21 is provided by coating a polymer film, n=1.6+, or an inorganic or organic multi-component sol-gel glass, n>1.6. Alternatively, organic modified silicates (ormosils) or organic/inorganic composites, n>1.55, can likewise be used. Plastics material with, for example, n=1.57, may also be used. After coating, adjacent cores 21 are separated by a post lithography/etching process to form discrete light guides 23. As can be seen from FIG. 2, the exposed surfaces 31 of cores 21 are not flush with the surface of substrate 13. The depth of each core 21 is, thus, approximately equal to the other width of the LEDs 25.

Each microlens 29 is formed by producing a gradient index lenslet in substrate 27, which may be of glass, plastic, organic/inorganic composition or sol-gel. Localized index changes are produced by diffusion of mono valent ions ($Ag+$, $Tl+$), or low molecular weight monomers, or ion implantation. In all these processes, a metal mask having small circular openings is first placed over substrate 27 by a process of metalizing one substrate surface. Then lithography is used to make an array of openings with equal spacing between centers. Ion exchange, through the small circular openings, changes the localized index of refraction via binary diffusion, to build an index distribution with iso-index contours that are spherical in shape (i.e. lens shape). The largest index change occurs at the openings and decreases radially outward to that of the substrate. Ion exchange or diffusion can be also made in a sol-gel or organic/inorganic composite substrate. By a second method, the exchange between a monomer and partially polymerized polymer host substrate of differing refractive index can build a micro lens array. Final thermal polymerization gives a rigid array of lenslets. In a third method, high energy ion implantation of such elements as $Pb+$, $Au+$, etc., followed by thermal diffusion, can give the requisite index change and lesn shaped contours. Through thermal treatment of the ion implanted substrate, atomic diffusion develops a spherical lens shape which extends under the mask opening. Microlenses 29 can be made aspherical shaped through an electrical bias on substrate 27 during the process of forming such microlenses, to enhance their focal properties.

After the microlenses 29 are formed, additional ligthography is used on the metal mask material, illustrated at 33 in FIG. 3, to open larger apertures 32 at each microlens. Having a diameter of 100 microns or less, and slightly smaller than the diagonal dimension of each light guide 23, each aperture 32 restricts far off-axis light rays from entering the substrate and passing to the image plane. The substrate 27 is then optically bonded via cement 26 to host 13 with each microlens 29 in registration with a corresponding light guide 23.

The above described structure permits each microlens 29 to image a large fraction, up to 60%, of the diffuse light emitted from its associated LED 25. A typical ray path is illustrated at 35 in FIG. 3.

The structure set forth above has several advantages. In the first place, each light guide 23 (FIG. 2) can conduct up to 60% of the light emitted from the associated LED 25. This gain in light channeling efficiency will reduce both the power required for, and the heat dissipated by, each LED 25. Secondly, it permits faster photoconductor drum rotation. Further, since each light guide 23 and microlens 29 are in axial alignment with their associated LED 25 (i.e., all the elements have the same pitch) and are separated from adjacent light guides to prevent cross talk, the light intensity of each LED 25 can be individually controlled with respect to its neighboring LED to produce a grey scale. Multiplexing of the LED array will, in turn, produce continuous tonal changes in the image plane. Finally, the spacing of the light guides 23 relative to each other results, in the image plane, in a small percentage of merging of adjacent focused spots to eliminate voids (i.e., white spaces) in the image plane.

Whereas the drawings and accompanying description have shown and described the preferred embodiment of the present invention, it will be apparent to those skilled in the art that various changes may be made in the form of the invention without effecting the scope thereof.

What I claim is:

1. A method of manufacturing a step-index light guide and gradient index microlens device comprising:
   a. providing a host material which is opaque to light;
   b. forming a multiplicity of channels in said host material;
   c. depositing a low refractive index film on the surface of said channels;
   d. filling said channels with a high refractive index material;
   e. providing a substrate;
   f. forming a multiplicity of gradient index microlenses in said substrate; and,
   g. bonding said substrate to said host material, with each of said microlenses being in optical alignment with a corresponding one of said channels.

2. A step-index light guide and gradient index microlens device comprising:
   a step-index light guide including:
      an opaque host material;
      a channel in said host material;
      low refractive index material coating the walls of said channel; and
      high refractive index material in said channel, said high refractive index material forming a core and the low refractive index material being adapted to reflect light back into said high refractive index material; and
   a micro imaging gradient index lens optically bonded to one end of said core and in optical registration with said light guide.

3. The light guide and microlens device of claim 2, wherein said microlens is formed in a substrate bonded to said core.

4. The light guide and microlens device of claim 3, wherein said substrate is made of glass, plastic or sol-gel glass.

5. The light guide and microlens device of claim 2, wherein the refractive index of said core is n>1.55 and the index of said low refractive index film is n<1.46.

6. The light guide and microlens device of claim 2 or 5, wherein said light guide transmits up to 60% of the light emitted from an LED.

7. The light guide and microlens device of claim 2, wherein said host material is a silicon wafer.

8. An array of light guides and microlenses for light emitting diode imaging, said array comprising a substrate of optically opaque material, a plurality of light guides having first and second ends and side surfaces extending between said ends, formed in parallel array in and separated from each other by, said opaque substrate, said light guides including a core of high refractive index material surrounded on said side surfaces by low refractive index matter, said first and second ends being exposed on opposite sides of said opaque substrate, a transparent substrate optically bonded to one of said opposite sides of said opaque substrate, said transparent substrate including a plurality of micro imaging gradient-index lenses in optical registration one with each of said light guides, and a plurality of LED's bonded to the other of said opposite sides one in optical registration with each of said light guides.

9. The array of claim 8, wherein the refractive index of said core is $n > 1.55$ and the index of said low refractive index film is $n < 1.46$.

* * * * *